(12) United States Patent
Chheda et al.

(10) Patent No.: US 7,358,446 B2
(45) Date of Patent: Apr. 15, 2008

(54) POWER DISTRIBUTION SYSTEM

(75) Inventors: Sachin Navin Chheda, Roseville, CA (US); Ricardo E. Espinoza-Ibarra, Carmichael, CA (US); Kirk Yates, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 10/685,175

(22) Filed: Oct. 14, 2003

(65) Prior Publication Data

US 2005/0078463 A1 Apr. 14, 2005

(51) Int. Cl.
*H05K 1/16* (2006.01)

(52) U.S. Cl. .................. 174/260; 174/117 F; 361/749; 361/792

(58) Field of Classification Search ............ 174/117 F, 174/254, 260; 361/749–751, 792–795
See application file for complete search history.

(56) References Cited

U.S. PATENT DOCUMENTS

| | | | |
|---|---|---|---|
| 5,083,238 A * | 1/1992 | Bousman | 361/788 |
| 5,980,267 A | 11/1999 | Ayers et al. | |
| 6,290,514 B1 | 9/2001 | McHugh et al. | |
| 6,356,448 B1 | 3/2002 | DiBene, II et al. | |
| 6,402,556 B1 | 6/2002 | Lang et al. | |
| 6,452,113 B2 | 9/2002 | Dibene, II et al. | |
| 6,559,733 B2 * | 5/2003 | Larson et al. | 333/22 R |
| 6,596,948 B1 | 7/2003 | Haden et al. | |
| 6,618,268 B2 | 9/2003 | DiBene, II et al. | |
| 6,623,279 B2 | 9/2003 | Derian et al. | |
| 2002/0171443 A1 | 11/2002 | Abazarnia et al. | |
| 2003/0062602 A1 | 4/2003 | Frutschy et al. | |
| 2003/0156400 A1 | 8/2003 | DiBene, II et al. | |
| 2006/0040523 A1 * | 2/2006 | Renfro et al. | 439/67 |

OTHER PUBLICATIONS

Samaras, Bill, "The Itanium Processor Cartridge", 2000 Intel Corporation, pp. 1-29 (2000).

* cited by examiner

*Primary Examiner*—Jeremy C Norris

(57) ABSTRACT

A power distribution system comprises a flexible power connector, a printed circuit board, a power supply, and a processor mounted on the printed circuit board. The flexible power connector comprises a first end electrically connected to the processor and a second end electrically connected to the power supply. The flexible power connector is configured with a length so that the power supply is in a spaced relationship relative to the processor and the flexible power connector includes a plurality of stacked layers arranged generally parallel to each other for distributed power transmission. These layers include at least two ground layers and at least one power layer. The power layer is sandwiched between two of the at least two ground layers.

16 Claims, 4 Drawing Sheets

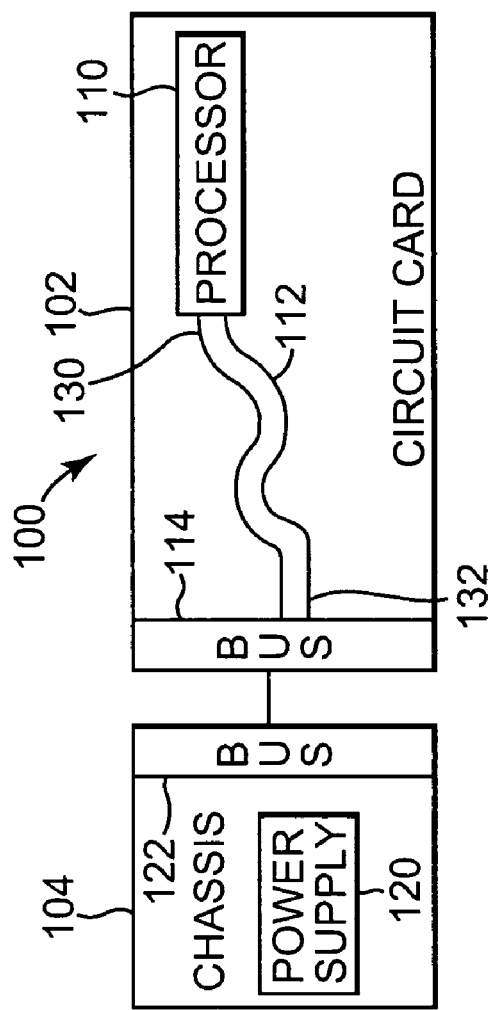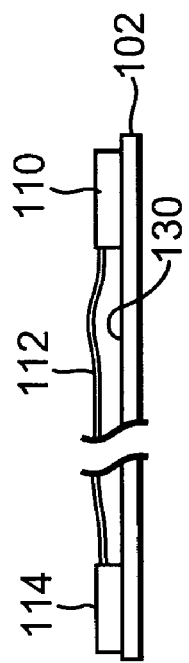

US 7,358,446 B2

POWER DISTRIBUTION SYSTEM

BACKGROUND

Computer technology continues to compress greater amounts of computing power, memory and input/output signals in smaller and smaller spaces. As the computing speed of processors, such as central processing units increases, larger amounts of power are required. In addition, the rate change and level of current entering and exiting these processors must be managed very closely. These power and current requirements of today's high-end processors challenge conventional computer circuitry design.

For example, at one time it was previously acceptable to locate a power supply remote from a processor, as in desktop computers where space is relatively generous. Many, if not virtually all, connections between respective circuit modules are made via a printed circuit board on which the modules reside. Accordingly, the power demands of today's high end processors are so high that the power supply for these high-end processors must be located immediately adjacent the processor to avoid disruptive inductance loops through the printed circuit board that are created if the power supply is located remotely from the processor.

While physical coplacement of the power supply and high-end processor on the printed circuit board alleviates an inductance problem, this arrangement introduces a whole set of challenges. For example, the large bulky power pod occupies an important space on a circuit board—the space immediately adjacent the processor. High-end processors have a large number of circuit traces, which require space on the circuit board immediately adjacent the processor. Memory is also sometimes located immediately adjacent the processor. Accordingly, the physical coplacement of the power supply with the processor takes a significant amount of space that otherwise would go to memory, circuit traces, and other circuit elements.

For these and other reasons, conventional ways of placing processors, power supplies, memory, and other functions on a printed circuit board fail to meet the challenges of today's computing power and form factors.

SUMMARY

One aspect of the present invention provides a power distribution system comprising a flexible power connector, a first printed circuit board, a power supply, and a processor mounted on a second printed circuit board, which is mounted on the first printed circuit board. The flexible power connector comprises a first end electrically connected to the processor and a second end electrically connected to the power supply. The flexible power connector is configured with a length so that the power supply is in a spaced relationship relative to the processor and the flexible power connector includes a plurality of stackedlayers arranged generally parallel to each other for distributed power transmission. These layers include at least two ground layers and at least one power layer. The power layer is sandwiched between two of the at least two ground layers.

BRIEF DESCRIPTION OF THE DRAWINGS

FIG. 4 is a plan view of a circuit card system, according to an embodiment of the present invention.

FIG. 5 is a side view of FIG. 4, according to an embodiment of the present invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims. All such variations are within the scope of the present invention.

Embodiments of the present invention are directed to a flexible power connector that distributes power in a low inductance path between a power supply and a processor. In one embodiment, this flexible power connector enables the power supply to be located remotely from the processor. In one embodiment, the flexible power connector also removes this path from some of the power and ground planes of the printed circuit board that support the processor. Moreover, the low inductance path provided by one embodiment of the flexible power connector enables other components, such as memory and other circuit traces and elements, to be located immediately adjacent the processor.

Figure 1:
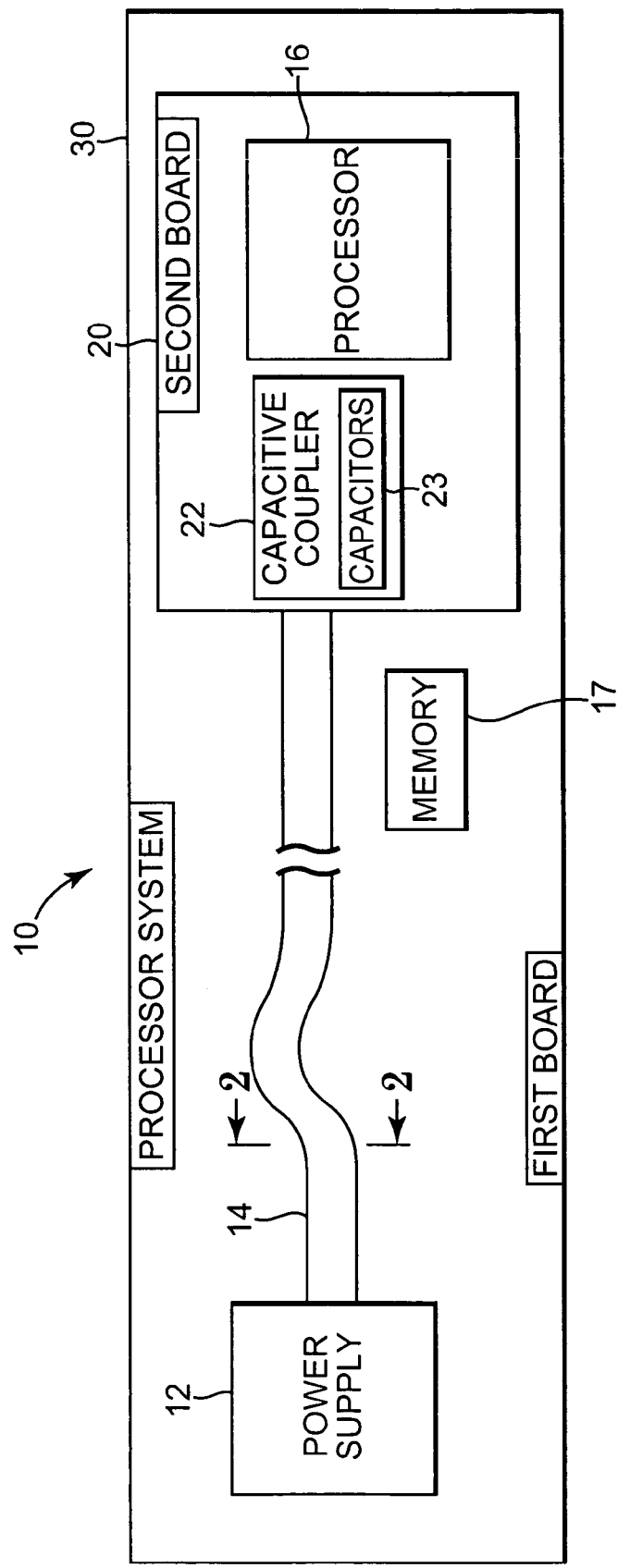
FIG. 1 is a plan view of a power distribution system, according to an embodiment of the present invention.

One exemplary embodiment of the present invention is shown generally in FIG. 1 as system 10. System 10 comprises power supply 12, flexible power connector 14, processor 16, memory 17, and first printed circuit board 30 (e.g. motherboard), on which these system components are mounted. System 10 also comprises second printed circuit board 20 (e.g. daughterboard), which is mounted on first printed circuit board 30, and which comprises capacitive coupler 22 including a plurality of capacitors 23. However, in one aspect, power supply 12 is optionally located on a frame (e.g. chassis) remote from printed circuit board 30, as will be described in more detail in association with FIG. 4.

Processor 16 comprises a microprocessor or central processing unit (CPU), particularly those used in high density computing. One example of processor 16 includes a high-end processor, which has high power requirements and stringent current requirements (e.g. high step current criteria), and which conventionally receives power from a power pod located immediately adjacent to processor 16. One example of processor 16 comprises a 64 bit Itanium processor from the Itanium Processor Family from Intel. Processor 16 is disposed on first printed circuit board 30 as part of a computer server, or workstation.

Power supply 12 is a power supply for operating processor 16, as well as other components of first printed circuit board 30 or server environment. In one aspect, power supply 12 is a power supply for a rack server, or other computer server/workstation. In another aspect, power supply 12 is a power supply for a blade server that is disposed on a blade chassis, separate from printed circuit board 30, for connecting to the blade server.

Second printed circuit board 20 comprises a mounting structure such as a daughter board adapted to mounting processor 16 on first printed circuit board 30, which acts as a motherboard. Capacitive coupler 22 comprises a plurality of capacitors 23, such as high speed capacitors, adapted to provide capacitive connecting between flexible board connector 14 and processor 16. Capacitive coupler 22 maintains a stable voltage for processor 16 and facilitates meeting the high current step requirements of processor 16.

Second printed circuit board 20 is optionally omitted from system 10 so that processor 16 is mounted directly to first printed circuit board 30 in an arrangement substantially to that shown in FIG. 5, such as system 100, in which processor 110 is mounted directly to circuit card 102. In this aspect of system 10, capacitive coupler 22 is optionally mounted directly on first printed circuit board 30 for electrically connecting flexible connector 14 to processor 16.

Flexible power connector 14 provides a low inductance path for distributing power transmission among a plurality of power planes and return ground planes between processor 16 and power supply 12. Flexible power connector 14 comprises a flexible circuitry board or flexible circuitry cable that includes multiple power planes, ground planes, and optional signal planes, all sandwiched together in stacked layers. Each plane for ground or power also optionally includes multiple layers of ground or power, respectively. Flexible power connector 14 is flexible and resilient so that it can be manipulated into various curved structures and maintain the manipulated shape. In addition, flexible power connector 14 maintains a positional and spatial relationship between its respective stacked layers, as will be further described in association with FIG. 3. Flexible power connector 14 is also relatively flat and thin so that it occupies little space on first printed circuit board 30 or other environment in which it is placed.

Flexible power connector 14 is independent (e.g. physically and electrically separated from) of first printed circuit board 30 (and second printed board 20) on which processor 16 is mounted. This configuration enables achieving the low inductance path through the layered configuration of flexible power connector and also saving spaces within first printed circuit board 30 and immediately adjacent to processor 16 on the surface of first printed circuit board.

The low inductance feature of flexible power connector 14 enables power supply 16 to be placed at a location remote from processor 16 since flexible power connector 14 minimizes a an inductance loop that otherwise occur using conventional power connection schemes over extended distances when supplying power to processor 16. This feature enables memory 17 to be located immediately adjacent to processor 16 (as shown in FIG. 1), demonstrating physical separation of power supply 12 and processor 16 which are no longer co-located together on first printed circuit board 30 (or on second printed circuit board 20).

FIGS. 2A-2C illustrate a sectional view of three different embodiments of flexible layer connector 14, including first flexible connector 40, second flexible connector 50, and third flexible connector 60. Any one of flexible connectors 40, 50, 60 can be used as flexible power connector 14 in system 10 of FIG. 1.

Each flexible connector 40, 50, 60 comprises a stacked arrangement of one or more ground layers, one or more power layers, and optionally includes one or more signal layers 46. Signal layer 46 carries control and monitoring signals between processor 16 and power supply 12.

The power and ground layers are interposed together within flexible connectors 40, 50, 60 in an alternating structure so that each power layer 44 has a complementary ground layer 42 to act as a ground return plane for current. Each power layer 44 also has at least one ground layer 42 on each side of power layer 44. As long as signal layer 46 is separated from any power layer 44 by one or more ground layers 42, signal layer 46 can be disposed at any level within the multiple layers of flexible connector(s) 40, 50, 60. Finally more than one ground layer can be placed between respective power layers or signal layers to provide each power plane with its own return ground return layer. Additionally, ground layers for multiple power planes may be combined.

To achieve a minimal an inductance loop via flexible connector(s) 40, 50, 60, the number of power layers 44, and ground layers 42 of flexible connector(s) 40, 50, 60 can be varied based on a length of flexible connector(s) 40, 50, 60, the power and current requirements of processor 16, and the characteristics and placement of power supply 12. A greater number of power planes and return ground planes generally aids in further minimizing an inductance loop between power supply 12 and processor 16.

Moreover, power layers and ground layers are placed in close proximity to each other to maximize capacitance between the respective layers. However, at the same time, the capacitance between the respective layers aids in minimizing voltage variances through flexible connector(s) 40, 50, 60, in cooperation with capacitive coupler 22, to thereby maintain a stable voltage for processor 16.

Accordingly, flexible connectors 40, 50, 60 provide three distinct examples for implementing these features of flexible power connector 14.

As shown in FIG. 2A, first connector 40 comprises first ground layer 42A, power layer 44, second ground layer 42B, and signal layer 46. Power layer 44 is sandwiched between first ground layer 42A and second ground layer 42B with signal layer 46 separated from power layer 44 by second ground layer 42B.

As shown in FIG. 2B, second connector 50 comprises first ground layer 42A, first power layer 44A, second ground layer 42B, signal layer 46, third ground layer 42C, second power layer 44B, and fourth ground layer 42D. Signal layer 46 is interposed between second and third ground layers 42B, 42C. First power layer 44A is sandwiched between first ground layer 42A and second ground layer 42B, and second power layer 44B is sandwiched between third ground layer 42C and fourth ground layer 42D.

As shown in FIG. 2C, third connector 60 comprises signal layer 46, first ground layer 42A, first power layer 44A, second ground layer 42B, second power layer 44B, third ground layer 42C, third power layer 44C, and fourth ground layer 42D. Signal layer 46 is disposed at top of layered structure 60 and separated from first power layer 44A by first ground layer 42A.

Of course, many other combinations ground and power layers of flexible power connector 14 can be implemented according to the features described above.

Figure 3:
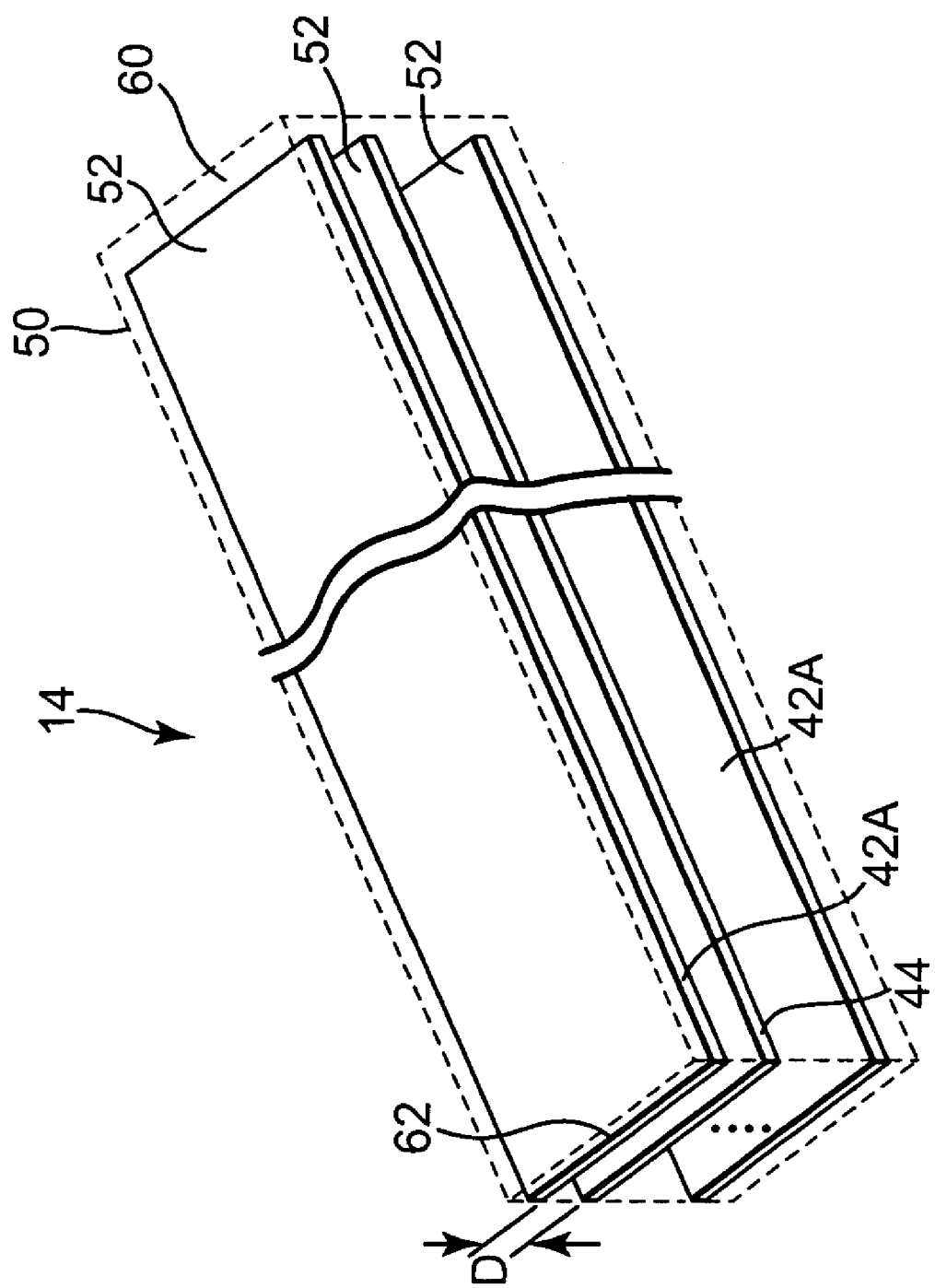
FIG. 3 is a perspective view schematically illustrating a flexible connector, according to an embodiment of the present invention.

FIG. 3 is a perspective view of flexible power connector 14 that schematically illustrates the stacked layered arrangement of respective ground layers 42A and power layers 44. Each ground and power layer 42A, 44, respectively, defines a plane element 52 of flexible circuitry member 50. An insulating material, and an insulating jacket, are disposed between and about plane elements 52, as known in the art of flexible circuitry. Plane elements 52 are generally parallel to each other, and remain in this spatial and positional relationship even when one or more portions of flexible circuitry member 50 are bent and/or placed in a convex or concave curved shape. Accordingly, a fixed distance D between respective plane elements 52 remains generally constant to preserve the electrical characteristics (e.g. inductance) expressed by this stacked layered arrangement, despite bending of flexible power connector 14 in various positions and curvatures.

FIGS. 4 and 5 illustrate another aspect of system 10 for implementing flexible power connector 14 as a low inductance path in which a power supply is not located on the same circuit card (e.g. motherboard, server card, etc) as the processor.

FIG. 4 is a plan view of a circuit card system 100. As shown in FIG. 4, system 100 comprises circuit card 102 and chassis 104. Circuit card 102 comprises processor 110, flexible connector 112, and bus 114 while chassis 104 comprises power supply 120 and bus 122.

Circuit card 102 comprises a blade server, a brick server, or other circuit card that is removably insertable into chassis 104 wherein chassis 104 provides power to circuit card 102 from power supply 120 via buses 114 and 122.

Figure 2:
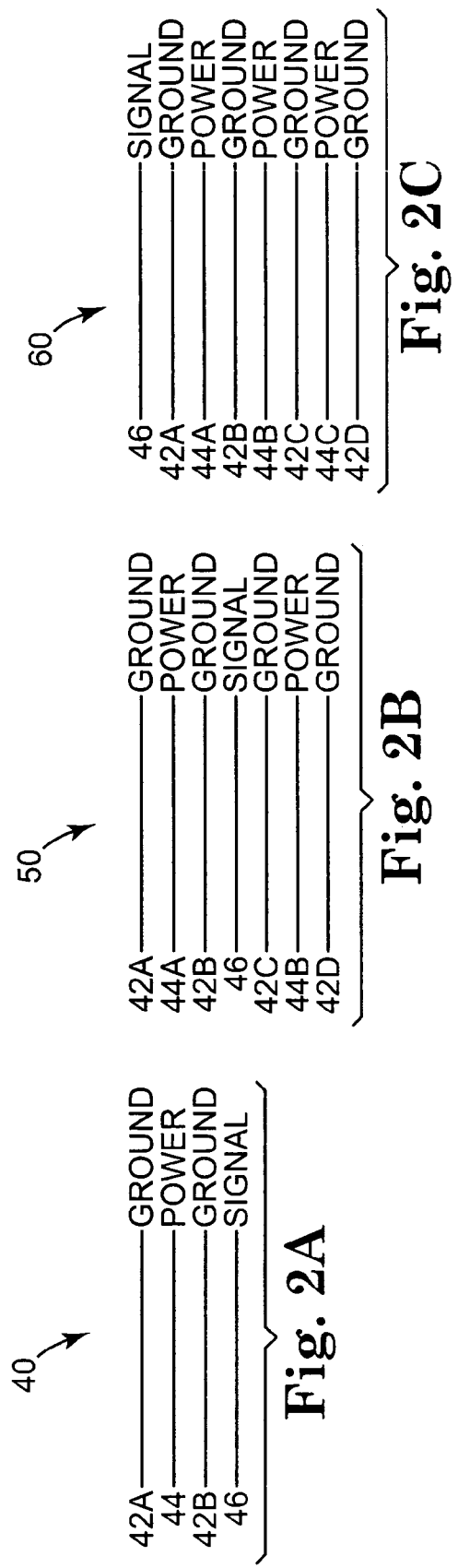
FIGS. 2A-2C are sectional views of FIG. 1 of alternate embodiments of a flexible connector, according to an embodiment of the present invention.

System 100 comprises substantially all of the same features and attributes of system 10 of FIGS. 1-2, except that power supply 120 is not located on same printed circuit board as processor 110. In particular, flexible connector 112 comprises substantially all the same features and attributes of flexible power connector 14. In addition, processor 110 also optionally is mounted on daughter board (such as second printed circuit board 20 in FIG. 1 via capacitive coupler 22), which would be mounted on circuit card 102. Moreover, with or without a daughter board, processor 110 is optionally connected to flexible connector 112 via a capacitive coupler, in a manner substantially similar to the use of capacitive coupler 22, as described and illustrated in association with FIG. 1.

As shown in FIG. 4, first end 130 of flexible connector 112 is connected to processor 110 and second end 132 of flexible connector 112 is connected to bus 114 of circuit card 102. Bus 114 includes a connector port for receiving second end 132 of flexible connector 112. When circuit card 102 is removably connected to chassis 104, bus 114 of circuit card 102 is electrically and mechanically connected to bus 122 of chassis 104 to thereby connect power supply 120 to processor 110 via flexible connector 112.

Accordingly, flexible connector 112 enables a low inductance path between a processor and a power supply even when the power supply is not located on the same circuit card (e.g. printed circuit board, motherboard, docking board, etc) as the processor. This feature makes flexible power connector 14 well suited for use in high density computing, such as blade server systems.

FIG. 5 is a partial side view of FIG. 4 that illustrates the physical separation between flexible connector 112 and circuit card 102. As shown in FIG. 5, flexible connector 112 extends between bus 114 and processor 110. Flexible connector 112 is separate from and is spaced above a surface 130 of circuit card 102 (e.g. printed circuit board) so that power planes and return ground planes of flexible connector 112 do not pass through server card 102 between processor 110 and power supply 114.

In addition, the malleability and resiliency of the flexible power connector 112 (and flexible power connectors 14, 40, 50, 60), and its ability to raised from the surface of the circuit card 102, optionally can be used to shape flexible power connectors 14, 40, 50, 60, 112 along a path that directs air from a cooling unit to a location where it is most needed, such as to the power supply 12, 120.

Embodiments of the present invention directed to a flexible connector provide a low inductance path between a power supply and a processor. The flexible connector enables locating the power supply remotely from the processor while still meeting the stringent power and current requirements of high end processors. Consequently, premium space that is closest to the processor can be used for memory, circuit traces, and other functions instead of being used for a bulky power pod. Moreover, since the power supply no longer needs to be co-located with the processor, there is much greater freedom in laying out a printed circuit board to optimize placement of all the components of the printed circuit board.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A power transmision system comprising:
   - a printed circuit board including a central processing unit;
   - a power supply spaced apart from and located remotely from the central processing unit;
   - a flexible circuitry connector extending between the power supply and the 64-bit central processing unit, the flexible circuitry connector comprising a first end electrical connected to the central processing unit and a second end electrical connected to the power supply, wherein the flexible circuitry connector has a length to maintain a distance between the first end and the second end of the flexible circuitry connector to maintain remote location of the power supply relative to the 64-bit central processing unit, wherein the flexible circuitry connector is physically spaced apart from and electrically independent of the printed circuit board,
   - wherein the flexible circuitry connector comprises a plurality of stacked layers arranged generally parallel to each other, wherein each respective stacked layer includes:
   - a plurality of ground layers;
   - at least one power layer; and
   - at least one signal layer,
   - wherein the at least one power layer is interposed between at least two of the plurality of ground layers and the at least one signal layer is separated from the at least one power layer by at least one of the respective ground layers and extends generally parallel to the respective ground layers and the at least one power layer.

2. The power transmission system of claim 1 wherein the central processing unit comprises a 64 bit central processing unit and wherein the printed circuit board comprises a first printed circuit board and the power transmission system further comprises a second printed circuit board mounted on the first printed circuit board, wherein the power supply mounted is on the first printed circuit board and the central processing unit is mounted on the second printed circuit board.

3. The power transmission system of claim 2 wherein the processor is electrically connected to the first end of the flexible circuitry connector via a capacitive coupler mounted on the second printed circuit board.

4. The power transmission system of claim 1 wherein the flexible circuitry connector comprises a resilient member configured to maintain its shape.

5. The power distribution connector of claim 1 and further comprising a power transmission system including the power distribution connector, the system comprising:
   a chassis; and
   a circuit card that is removably insertable into the chassis, wherein the power supply is mounted on the chassis and the processor is mounted on the circuit card with the power supply electrically connected to the second end of the connector and the processor electrically connected to the first end of the connector.

6. The system of claim 5 and further comprising:
   a bus interface configured to electrically and mechanically connect the circuit card and the chassis wherein the second end of the connector is connected to the power supply via the bus interface.

7. The power transmission system of claim 1 wherein the power supply is mounted on the printed circuit board.

8. The power transmission system of claim 1 wherein the at least one signal layer is disposed between two of the respective ground layers.

9. The power transmission system of claim 1 wherein the at least one signal layer is disposed an outside layer adjacent only one of the respective ground layers.

10. The power transmission system of claim 1, wherein the power transmission system comprises a computer system.

11. A power transmission connector comprising:
   means for transmitting power directly from a power supply to a 64-bit central processing unit independent from a printed circuit board on which the 64-bit central processing unit is mounted, the means for transmitting power including means for distributing the power between a plurality of ground planes and a plurality of power planes arranged for minimizing an inductance loop between the power supply and the 64-bit central processing unit.

12. The connector of claim 11 and farther comprising a printed circuit board wherein the 64-bit central processing unit is mounted on the printed circuit board, wherein the means for transmitting power comprises a flexible circuitry board comprising a first end electrically connected to the 64-bit central processing unit and a second end electrically connected to the power supply, the flexible circuitry board configured with a length to maintain the power supply in a remote physical location relative to the central processing unit, wherein the flexible circuitry board is physically independent of, and spaced apart from, the printed circuit board, and wherein the means for distributing the power comprises the ground planes and the power planes arranged generally parallel to each other so that at least one power plane is sandwiched between a pair of ground planes and at least one signal plane extends within the flexible circuitry board generally parallel to the respective ground planes and power planes.

13. A computer system comprising:
   a printed circuit board including a central processing unit;
   a power supply spaced apart from and located remotely from the central processing unit;
   a flexible circuitry connector comprising a first end electrical connected to the central processing unit and a second end electrical connected to the power supply, wherein the flexible circuitry connector has a length that defines a distance between the first end and the second end of the flexible circuitry connector to maintain remote location of the power supply relative to the central processing unit, wherein the flexible circuitry connector is physically spaced apart from and electrically independent of the printed circuit board, and
   wherein the flexible circuitry connector comprises a plurality of stacked layers arranged generally parallel to each other, wherein each respective stacked layer includes:
   a plurality of ground layers;
   at least one power layer; and
   at least one signal layer,
   wherein the at least one power layer is interposed between at least two of the plurality of ground layers and the at least one signal layer is separated from the at least one power layer by at least one of the respective ground layers and extends generally parallel to the respective ground layers and the at least one power layer.

14. The computer system of claim 13 wherein the power supply is mounted on the printed circuit board.

15. The computer system of claim 13 wherein the printed circuit board comprises a first printed circuit board and the computer system further comprises a second printed circuit board mounted on the first printed circuit board, wherein the power supply mounted is on the first printed circuit board and the central processing unit is mounted on the second printed circuit board.

16. The computer system of claim 14 wherein the central processing unit is a 64-bit central processing unit.

* * * * *

UNITED STATES PATENT AND TRADEMARK OFFICE
CERTIFICATE OF CORRECTION

PATENT NO. : 7,358,446 B2  Page 1 of 1
APPLICATION NO. : 10/685175
DATED : April 15, 2008
INVENTOR(S) : Sachin Navin Chheda et al.

It is certified that error appears in the above-identified patent and that said Letters Patent is hereby corrected as shown below:

In column 6, line 33, in Claim 1, delete "transmision" and insert -- transmission --, therefor.

In column 7, line 47, in Claim 12, delete "farther" and insert -- further --, therefor.

Signed and Sealed this

Fifth Day of August, 2008

JON W. DUDAS
*Director of the United States Patent and Trademark Office*